United States Patent

Piaton

[19]

[11] Patent Number: 5,806,073
[45] Date of Patent: Sep. 8, 1998

[54] METHOD FOR THE COMPARISON OF COMPUTER FILES

[76] Inventor: Alain Nicolas Piaton, 2 rue Alexandre-Berteleau, Neuilly F-92200, France

[21] Appl. No.: 676,380

[22] PCT Filed: Jan. 18, 1995

[86] PCT No.: PCT/FR95/00053

§ 371 Date: Jul. 18, 1996

§ 102(e) Date: Jul. 18, 1996

[87] PCT Pub. No.: WO95/20196

PCT Pub. Date: Jul. 27, 1995

[30] Foreign Application Priority Data

Jan. 21, 1994 [FR] France ................... 94 00623

[51] Int. Cl.$^6$ .............................................. G06F 9/44
[52] U.S. Cl. ............................................... 707/200
[58] Field of Search ............................... 707/3, 200, 201, 707/202, 203, 204, 6

[56] References Cited

U.S. PATENT DOCUMENTS

| | | | |
|---|---|---|---|
| 4,053,871 | 10/1977 | Vidalin et al. ................ | 340/146.2 |
| 5,475,625 | 12/1995 | Glaschik ........................ | 395/600 |
| 5,566,328 | 10/1996 | Eastep .......................... | 395/600 |
| 5,590,320 | 12/1996 | Maxey .......................... | 395/619 |
| 5,603,020 | 2/1997 | Hashimoto et al. ............ | 395/616 |
| 5,608,865 | 3/1997 | Midgely et al. ............... | 395/180 |
| 5,619,690 | 4/1997 | Matsumani et al. ........... | 395/616 |
| 5,623,666 | 4/1997 | Pike et al. .................... | 395/616 |

OTHER PUBLICATIONS

Database TDB IBM–Tech Discl Bull. v. 34, No. 9 Feb. 9, 1992 pp. 188–191.
IBM. Tech Discl. Bull v 33 No. 3a Aug. 1990 p. 190.

*Primary Examiner*—Thomas G. Black
*Assistant Examiner*—Michael J. Wallace, Jr.
*Attorney, Agent, or Firm*—Roland Plottel

[57] ABSTRACT

A process for comparison of computer files, ordinary or special, e.g., of executable type, data files, system files and setup files, stored in at least one external storage memory, structured under the form of directory trees containing the files, having the following steps: (1) memorization at time $t_0$ of a first state of at least one external storage memory which has at least one first table whose rows refer to the directories, and at least one second table whose rows refer to the files, (2) memorization at time $t_1=t_0+T$ of a second state of at least one similar external storage memory, and (3) comparison of the first state with the second state, which has at least temporary memorization step of the informations stored in the states concerning respectively directories and files that have been deleted, directories and files that have been added, directories and files that have been modified, directories and files that are identical.

10 Claims, 1 Drawing Sheet

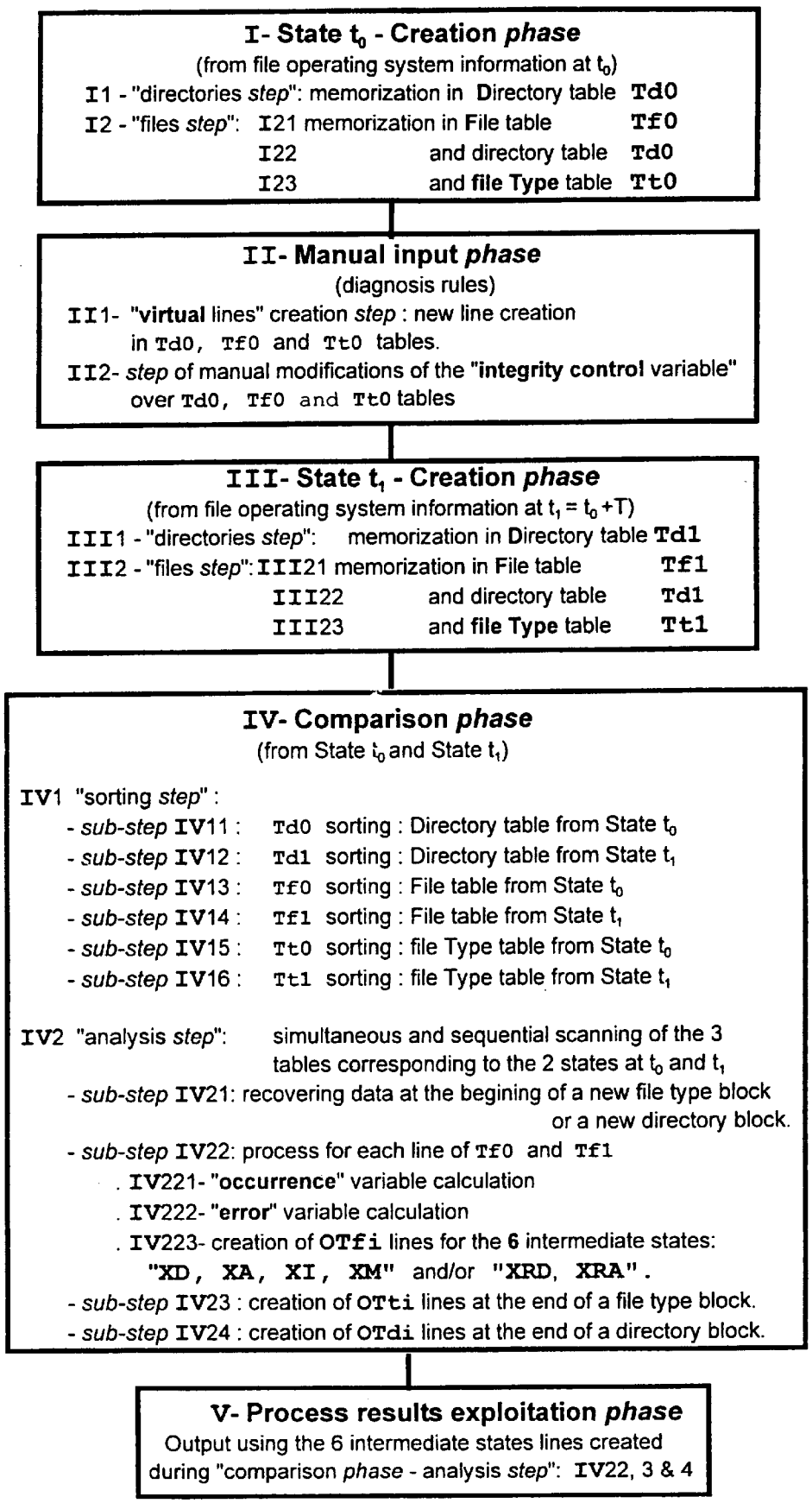

METHOD FOR THE COMPARISON OF COMPUTER FILES

BACKGROUND OF THE INVENTION

The invention relates generally to computer files and to processes for comparing computer files.

1. Summary of the Invention

This invention is about a process for comparing computer files stored on external storage memories that is specially intended for control, analysis and administration of important volumes.

Generally and for any operating system:

a external storage memory is a storing hardware unit or a group of such units, divided into sectors, as are for example magnetic, optical or magneto-optical disks, magnetic tapes, floppy disks, etc. This external storage memory is itself divided or assembled to other external storage memories into logical units called partitions or volumes;

a file is a character string stored on a volume. There are special and ordinary files. Special files are files that are necessary and sufficient for the machine to work properly (system files and executable files), ordinary files are those which are not special files;

on a physical point of view, a directory, also called a folder or a catalogue, is a file of a certain type. On a logical point of view, a directory contains files and other directories called sub-directories that in turn contain other files and directories. The only directory that does not belong to any other one is the root directory or main directory. Hence we define a file system that has a tree structure. Designating a file is done through the referencing of the directories. This defines a unique path of the directory tree, starting at the root directory, ending at the directory containing the given file and including all the intermediate directories of the directory tree.

In certain operating systems such as MS-DOS, the name of a file consists of two parts, the name itself plus a file type also called extension or suffix.

File managers named "NORTON", "PC TOOLS", "WINFILE", "DOSSHEL" are found under the DOS, WINDOWS, MAC/OS, OS/2, NETWARE and XENIX (UNIX) operating systems. These enable to see the directories and files of the external storage memories accessible to the computer running the manager, they allow to navigate in the directory trees and to manually select the said directories and files in order to move, copy or delete them.

Furthermore, some high end operating systems handle directory and file permissions that enable to control the creation, modification and deletion of directories and files.

These means, let alone, give a system administrator only a very limited control over the state of his system, particularly if the number of files is very important.

Indeed, the system administrator has to check that the system he controls is coherent and more specifically that there are no missing files that may impede applications to run properly, that the content of certain files has not been modified and that files have not been stored in wrong directories. All of which is almost impossible to do with usual means when there are files by the tens of thousands.

A solution to significantly reduce the number of files to examine is to conceive an automatic verification system that analyses the content of each directory. If no files have been modified nor added nor deleted in a directory between time to, when it was in a correct state, and time $t_1$, the directory is said to be without problems. If it is not the case, it is said to be suspicious and has to be examined.

Nevertheless, the number of files to examine is still much to high and that solution does not settle the very frequent situation described in the following example:

In a word processing directory, correct at time to, there is:

a mandatory executable file: "wordproc.exe" (special file)

a data file: "textNo1.doc" (ordinary file)

no backup file with the extension: bak

If at time $t_1$ the file "wordproc.exe" has been modified or if a file "exectx.ov1" has been added in the directory, there is an error.

But if "textNo1.doc" has been modified or if a file "textNo1.bak" has been added in the directory, there is no error.

The invention's aim is to solve the above drawbacks by offering an automatic analysis system that takes into account computer file particularities. These particularities are related to their type being special or ordinary notably amongst the types executable, data file, system file and parameter file. These files being stored on at least one computer external storage memory in the form of a directory tree in which the directories contain the said files. For this, the invention concerns a process for comparing computer files that consists of the following steps:

memorization at time to of a first state of at least one external storage memory made up of at least one first table whose lines refer to the directories and whose columns contain information on these directories given by the computer operating system but also made up of at least one second table whose lines refer to the files and whose columns contain information on these files given by the computer operating system, memorization at time $t_1=t_0+T$ of a second state of at least one external storage memory made up of at least one first table whose lines refer to the directories and whose columns contain information on these directories given by the computer operating system but also made up of at least one second table whose lines refer to the files and whose columns contain information on these files given by the computer operating system, comparison of all or only a part of the first state with all or only a part of the second state, which consists of at least one of the following steps:

a) at least temporary memorization of the informations stored in the compared part of the states concerning respectively directories and files that have been deleted, that is to say that have been found in the first and second table respectively of the compared part of the first state but that where not found in the first and second table respectively of the compared part of the second state, b) at least temporary memorization of the informations stored in the compared part of the states concerning respectively directories and files that have been added, that is to say that have not been found in the first and second table respectively of the compared part of the first state but that where found in the first and second table respectively of the compared part of the second state, c) at least temporary memorization of the informations stored in the compared part of the states concerning respectively directories and files that have been modified, that is to say that have been found in the first and second table respectively of the compared part of the first state and that where also found in the first and second table respectively of the compared part of the second state but for which the rows and columns of the respective directories and files of the first and second table of the first state differ from the corresponding rows and columns of the respective directories and files of the first and second table of the second state.

d) at least temporary memorization of the informations stored in the compared part of the states concerning respectively directories and files that are identical, that is to say that have been found in the first and second table respectively of the compared part of the first state and that where also found in the first and second table respectively of the compared part of the second state and for which the rows and columns of the respective directories and files of the first and second table of the first state are identical to the corresponding rows and columns of the respective directories and files of the first and second table of the second state.

Alternately, the comparison step described above may differ and may instead consist of at least one of the following steps:

a) at least temporary memorization of the reunion on one hand of the informations concerning the files and directories stored in the compared part of the second state and on the other hand of the informations stored in the compared parts of the states concerning the files and directories that have been deleted.

b) at least temporary memorization of the reunion on one hand of the informations concerning the files and directories stored in the compared part of the second state and on the other hand of the informations stored in the compared parts of the states concerning the files and directories that have been added.

In a preferred realization mode, at least one of the states possesses at least a third table containing lines that relate to the file types of a given directory of the directory tree of a computer the external storage memory. These types classify the ordinary and special files within the said directory. That third table associates to each of the mentioned types of the files of the directory informations obtained through logical and arithmetical operations as well as character string operations performed on the informations supplied by the computer operating system. The informations described above and compiled for each of the types of the files in the given directory are stored columnwise in the mentioned third table.

In an advantageous realization mode, the comparison process is preceded by a step of memorization of comparison criteria called "diagnosis rules" over respectively the directories, the files and the types of files. These criteria are verified during the comparison step in a phase called "diagnosis rules" verification phase.

BRIEF DESCRIPTION OF THE DRAWINGS

FIG. 1 is a flow chart illustrating the process for comparison of computer files according to the invention.

DESCRIPTION OF THE PREFERRED EMBODIMENTS

The invention's automatic file analysis process is specifically aimed towards analysis, control and maintenance of large numbers of computer files.

In order to be as precise as possible the descriptions given here after will be given in a MICROSOFT DOS operating system environment. It will be easy for an expert to consult the specifications of file systems of other operating systems and to existing related literature in order to have the process work in other environments.

The DOS FAT file system, that stands for "File Allocation Table" takes its name from its organization method that uses a table to link the different allocation units (one or more external storage memory sectors) of a file between them. That table is duplicated so that certain controls may be performed.

Apart from this table, a external storage memory partition has a root directory that has a fixed length and that is at a fixed place in memory. The other directories are special files each composed of 32 byte entries for each file in the directory. Each directory entry holds the following information:

the file name over 8 bytes, the file extension over 3 bytes (the DOS extension will be assimilated as the file type), the file attributes over 1 byte, are included in the later one bit for a directory type of file and another bit for a volume name type of file (there may only be one entry of this kind per volume, a volume being a external storage memory partition), followed by 10 reserved bytes, hour and date of last file write access over 4 bytes, starting file allocation unit over 2 bytes (the other file allocation units are given in the FAT), the size of the file over 4 bytes.

The first byte of the name, at offset 00h of the directory entry, may be a character or one of the following special codes:

00h Entry not used, the other characters of the name are spaces (20h),

2Eh Entry used as a directory alias or as a parent directory (in which case the second byte is also 2Eh), E5h Deleted entry, The DOS "findfirst" and "findnext" functions of a C compiler (BORLAND C++ for example) enable to fetch easily the informations of the mentioned FAT.

A table is defined in the following as being the set of occurrences (also called table lines) of a data structure (also called table columns).

In a preferred realization mode, inside each table, the number of columns per line is constant, as is the size of each column, so that the size of a line being equal to the sum of the sizes of the different columns is equally constant. The result of such a structure is that in order to access the Xth column of the Yth line, only a simple and classic offset calculation from the start of the table is needed.

Referring now to FIG. 1, the automatic file comparison and analysis process of the invention involves a first phase known as the "creation phase $t_0$" during which at $t_0$ tables containing informations provided by the operating system are memorized. These tables represent a state called "state $t_0$" of the external storage memories or of a homogeneous subset of these. A second phase known as the "manual input phase" follows, in which information is manually added to the given tables of "state i $t_0$" followed by a third phase known as "creation phase $t_1$" that is identical to "creation phase $t_0$" and during which tables representing a state called "state $t_1$" are created at time "$t_1=t_0+T$", state of the same or of other external storage memories. Then starts a fourth phase known as the "comparison phase" during which six sets of tables representing six intermediate states are generated from the tables of "state $t_0$" and of "state $t_1$". Finally a fifth phase known as the "results exploitation phase" takes place. During that last phase, the tables generated during the fourth phase are used to output analysis reports and to take corrective measures on the external storage memory files.

The "creation phase $t_0$" consists in the memorization of three tables. The first table Td0 contains the informations concerning the directories of the external storage memory being treated, the second table Tf0 contains the informations concerning the files of the external storage memory being treated and the third table Tt0 contains the informations concerning the types of files of the external storage memory being treated.

These three tables have columns, some of which are calculated during the mentioned "creation phase" while others are initialized during the mentioned "creation phase" after which information is added manually during the mentioned phase "manual input phase", others finally are initialized during the mentioned "creation phase" after which they are calculated during the mentioned "comparison phase". Accessing the values of these columns of a given line is done through the use of variables.

Hereafter is an example showing the three table structure of a state and the "creation phases" of these tables.

The first table Td0 or Td1 of a state, concerning the directories of the external storage memories being treated consist of the following columns:

A first series of columns of the first table of a state known as the "directories table", is built from the information provided by the operating system, amongst which we find:

A unique identifier, for example the line number in the table over 4 bytes, the directory name over 8 bytes, the directory extension over 3 bytes, the directory attributes over 1 byte, the hour and date of the last directory write access over 4 bytes, the sum of the sizes of the files that are within the directory over 4 bytes, the parent directory's identifier over 4 bytes, the level of this directory in the directory tree (0 is the level of a "Super root" directory of the external storage memory, a directory added for the needs of the process, and on which are attached the root directories, having a level of 1, of each of the volumes of the given external storage memory. This enables, while keeping the same tree structure, to group in one same table information concerning all the volumes of the given external storage memory. Directories of level n are children directories of a level n-1 parent directory as well as grand-children directories of a level n-2 directory, etc.).

the number of children directories within the given directory over 2 bytes, the smallest child directory identifier, within the given directory, in the present table over 4 bytes, the number of files within the given directory over 2 bytes, the smallest file identifier, within the given directory, in the second table over 4 bytes, the number of file extensions within the given directory over 2 bytes, the smallest file extension identifier, within the given directory, in the third table over 4 bytes, A "checksum" over 4 bytes made out of the bitwise sum of the "checksums" (described later on) of all the files within the given directory, A second series of columns of the first table of a state known as the "directories table", is initialized during the "creation phase" and filled with information calculated during the "comparison phase", amongst which we find:

A column containing for each line the value of an "occurring variable" over 1 byte, initialized to 0h when the line was created during the mentioned "creation phase" and calculated during the mentioned "comparison phase" between the first "state $t_0$" and the second "state $t_1$" to memorize the presence, simultaneously or not, of the same files within the same directory of "state $t_0$" and of "state $t_1$".

A third series of columns of the first table of a state known as the "directories table", is initialized during the "creation phase" and filled manually with information during the "manual input phase". This third series of columns contains a set of comparing criteria known as "diagnosis rules". These criteria are available for each line by means of variables and are applied to all the files of the line given directory. Among these columns we find:

A column containing for each line the value of an "integrity control variable" over 2 bytes, initialized to zero at the line's creation, manually filled during the "manual input phase" and used during the "comparison phase" after the calculation of the "occurring variables" to make an anomaly and error definition test concerning the files of the directory given by the said line and with respect to the said "occurring variables".

A column containing for each line the value of a "size control variable" over 1 byte, initialized to zero at the line's creation, manually filled during the "manual input phase" and used during the "comparison phase" to make an error definition threshold resulting notably from an excessive increase in the size or number of the files of the directory given by the said line.

Finally a fourth series of columns of the first table of a state known as the "directories table", is initialized during the "creation phase" and calculated during the "comparison phase". This fourth series of columns contains a set of error values that are the result of tests done at comparison time and based on the "diagnosis rules" available for each line by means of variables and applied to all the files of the line given directory. Among these columns we find:

A column containing for each line the value of an "integrity error variable" over 1 byte, initialized to zero at the line's creation, zero indicating the absence of errors, and updated during the "comparison phase" after the calculation of the "occurring variables" to memorize the errors concerning the files of the directory given by the said line, with respect to the values of the mentioned "occurring variables" and based on the informations given by the mentioned "integrity control variables" concerning the given directory.

A column containing for each line the value of a "size error variable" over 1 byte, initialized to zero at the line's creation, zero indicating the absence of errors, and updated during the "comparison phase" to memorize the errors resulting notably from an excessive increase in the size or number of the files of the directory given by the said line, with respect to the values of the mentioned "size control variable" concerning the given directory.

This "size control variable" obeys the same rules as those obeyed by the "integrity control variable" but concerns errors resulting from an excessive increase in the file sizes.

Each directory of the external storage memory being treated has one and only one line in the first table known as the "directories table". The character string is written onto disk with the help of the C compiler disk library functions.

The "checksum" may be much more complex, and be constructed using a higher number of bytes and take into account other informations in order to maximize the probability that a change over an element of the directory modifies the said "checksum".

The second table Tf0 or Tf1 of a state concerning the files of the treated external storage memories contains the following columns:

A first series of columns of the second table of a state, know as the "files table", is built from the informations provided by the operating system, amongst which we find:

a unique identifier over 4 bytes, for example the number of the line in the table, the name of the file over 8 bytes, the file extension over 3 bytes, the file attributes over 1 byte, are included in the later one bit for a directory type of file and another bit for a volume name type of file (there may only be one entry of this kind per volume, a volume being a external storage memory partition), the hour and date of last file write access over 4 bytes, the size of the file over 4 bytes, an identifier in the first table on the parent directory containing the file over 4 bytes, the level of the directory containing the file, a "checksum" over 4 bytes made from the bitwise sum of the 4 bytes of the file size, of the 4 bytes of the hour and date of last file write access, of the 3 bytes of the extension, of the 4 first bytes of the name and of the last 4 bytes of the name.

A second series of columns of the second table of a state known as the "files table", is initialized during the "creation phase" and filed with information calculated during the "comparison phase", amongst which we find:

A column containing for each line the value of an "occurring variable" over 1 byte, initialized to 0h when the line was created during the mentioned "creation phase" and calculated during the mentioned "comparison phase" between the first "state $t_0$" and the second "state $t_1$" to memorize the presence, simultaneously or not, of the file over both states.

A third series of columns of the second table of a state known as the "files table", is initialized during the "creation phase" and filled manually with information during the "manual input phase". This third series of columns contains a set of comparing criteria known as "diagnosis rules". These criteria are available for each line by means of variables and are applied to the file given by the line. Among these columns we find:

A column containing for each line the value of an "integrity control variable" over 2 bytes, initialized to zero at the line's creation, manually filled during the "manual input phase" and used during the "comparison phase" after the calculation of the "occurring variables" to make an anomaly and error definition test concerning the files of the directory given by the said line and with respect to the said "occurring variables".

A column containing for each line the value of a "size control variable" over 1 byte, initialized to zero at the line's creation, manually filled during the "manual input phase" and used during the "comparison phase" to make an error definition threshold resulting notably from an excessive increase in the size of the file given by the said line.

Finally a fourth series of columns of the second table of a state known as the "files table", is initialized during the "creation phase" and calculated during the "comparison phase". This fourth series of columns contains a set of error values produced by the tests done at comparison and based on the "diagnosis rules", Among these columns we find:

A column containing for each line the value of an "integrity error variable" over 1 byte, initialized to zero at the line's creation, zero indicating the absence of errors, and updated during the "comparison phase" after the calculation of the "occurring variables" to memorize the errors concerning the file given by the said line, with respect to the values of the mentioned "occurring variables" and based on the informations given by the mentioned "integrity control variables" concerning the file and concerning the directory in which the file is.

A column containing for each line the value of a "size error variable" over 1 byte, initialized to zero at the line's creation, zero indicating the absence of errors, and updated during the "comparison phase" to memorize the errors concerning the file given by the said line, with respect to the values of the mentioned "size control variable" concerning the file and concerning the directory in which it is.

An advantageous characteristic of the invention, when dealing with a multi-user operating system, is that we could memorize in the same way other informations provided by the operating system, such as the hour and date of last file read mode access, the number of the station on which a file was created or copied, etc., depending on whether or not the operating system is capable of handling these operations without having to open the file in either one of the process phases.

Each file of the treated external storage memory has one and only one line in the second table. The character string making this second table is written onto disk right after the character string making the first table using the C compiler disk library functions.

Under DOS, the 3 bytes file extension is strongly related to the type of the file:

the EXE and COM extensions are those of executable type of files, the OVL extensions are those of overlay type of files, the BAT extensions are those of batch type of files, the BAK extensions are usually those of backup type of files, the SYS and DRV are those of driver type of files, etc.

In other operating systems such as the MAC/OS, the type is not used as an extension. It does not appear with the name but can still be used in the same way.

It will also be possible to imagine an enlarged notion of the type consisting of a grouping of types. For DOS, the files that can be run from the command line would constitute a type that would include the EXE, COM and BAT types and that could be called the type for special files. Other files belonging to the ordinary files type.

Word processing data files could also be considered as being another type of special files that include the DOC extension of documents and the DOT extensions of templates. Other files belonging to the ordinary files type.

All the specified types make up the special files types, the ones not specified making up the ordinary files type.

The third table Tt0 or Tt1 of a state concerning the file types of the treated external storage memories contain the following columns:

A first series of columns of the third table of a state, know as the "types table" or "extensions table", is built from the informations provided by the operating system, amongst which we find:

a unique identifier over 4 bytes, for example the number of the line in the table, the identifier in the first table of the given directory containing at least one file having the mentioned extension over 4 bytes, the extension over 3 bytes, the level of the given directory containing the files having the mentioned extensions over 2 bytes, the sum of the sizes of the files within the given directory and having the mentioned extension over 8 bytes, the number of files within the given directory and having the mentioned extension over 4 bytes, a "checksum" over 4 bytes made from the bitwise sum of the "checksums" of the files within the given directory and having the mentioned extensions.

A second series of columns of the third table of a state known as the "extensions table", is initialized during the "creation phase" and filed with information calculated during the "comparison phase", amongst which we find:

A column containing for each line the value of an "occurring variable" over 1 byte, initialized to Oh when the line was created during the mentioned "creation phase" and calculated during the mentioned "comparison phase" between the first "state $t_0$" and the second "state $t_1$" to memorize the presence, simultaneously or not, of the same files having that extension in "state $t_0$" and in "state $t_1$".

A third series of columns of the third table of a state known as the "extensions table", is initialized during the "creation phase" and filled manually with information during the "manual input phase". This third series of columns contains a set of comparing criteria known as "diagnosis rules". These criteria are available for each line by means of variables and are applied to the files having the type given by the line. Among these columns we find:

A column containing for each line the value of an "integrity control variable" over 1 byte, initialized to zero at the line's creation, manually filled during the "manual input phase" and used during the "comparison phase" after the calculation of the "occurring variables" to make an anomaly and error definition test concerning the files having the type given by the said line and with respect to the said "occurring variables".

A column containing for each line the value of a "size control variable" over 1 byte, initialized to zero at the line's creation, manually filled during the "manual input phase" and used during the "comparison phase" to make an error definition threshold resulting notably from an excessive increase in the size or in the number of the files having the type given by the said line.

Finally a fourth series of columns of the third table of a state known as the "extensions table", is initialized during the "creation phase" and calculated during the "comparison phase". This fourth series of columns contains a set of error values produced by the tests done at comparison and based on the "diagnosis rules" available for each line by means of variables and applied to all the files having the type given by the said line. Among these columns we find:

A column containing for each line the value of an "integrity error variable" over 1 byte, initialized to zero at the line's creation, zero indicating the absence of errors, and updated during the "comparison phase" after the calculation of the "occurring variables" to memorize the errors concerning the files having the type given by the said line, with respect to the values of the mentioned "occurring variables" and based on the informations given by the mentioned "integrity control variables" concerning the files having that extension.

A column containing for each line the value of a "size error variable" over 1 byte, initialized to zero at the line's creation, zero indicating the absence of errors, and updated during the "comparison phase" to memorize the errors concerning the files having the type given by the said line, with respect to the values of the mentioned "size control variable" concerning the files with that extension.

Each file extension of the treated external storage memory has as many lines as there are directories containing at least one of the considered extensions. In other words and for a given directory, there are as many lines in the table as there are different extension types in that directory. The character string making this third table is written onto disk right after the character string making the first and second table using the C compiler disk library functions.

Generally speaking, in the first and third tables defined in the present realization mode, not all the informations described previously are necessary to solve the technical problem at hand. Some of these have been presented because they enhance performances during the comparison steps. In the same way, it would be possible to add other informations so as to accelerate treatments or to make them more secure without altering the invention's purpose.

The process of the "creation phase", illustrated in blocks I or III of FIG. 1, between the reading of the tables of the file system of the operating system and the memorization of the states in RAM or in external storage memory, is a process that involves selecting, sorting and calculating which is done in memory with known techniques in one or more table writing cycles, techniques such as those provided to programmers by third generation languages like the C language.

In a first step I.1 or III.1 of the "creation phase" known as the "directories step", the process reads the whole directory tree of the single or of the different volumes being treated and generates the first directories table filling only those informations related to the tree structure (a unique identifier, the directory name, the directory extension, the directory attributes, the date and time of last write access, the parent directory's identifier, the level of the directory in the tree, the number of children directories in the given directory, etc.)

In a second step I.2 or III.2 of the "creation phase" known as the "files step", the first table Td0 or Td1, is read again line after line and the corresponding directories are explored in order to gather the informations related to the files of that given directory, and to calculate and memorize those informations in the first table for each directory on one hand (the sum of the sizes of the files within the directory, the number of files within the directory, the number of file extensions in the given directory, a "checksum"), and on the other hand, in the second table Tf0 or Tf1 for each file (a unique identifier, the name of the file, the file extension, the file attributes, the date and hour of the file's last write access, the file size, a "checksum", etc.), and at last in the third table Tt0 or Tt1 for each extension within a directory (a unique identifier, the identifier of the given directory, the extension, the sum of the sizes of the files within the directory and having the given extension, the number of files within the given directory and having the given extension, a "checksum").

The file resulting from the first "creation phase" (block I) is a first state including tables Td0Tf0 and Tt0 and, known as "state $t_0$" made at $t_0$, the memorizing time of the treated external storage memory.

The said "creation phase" (Block I of FIG. 1) is followed by a second phase known as the "manual input phase" (block II of FIG. 1) that concerns only "state to" $t_0$ which we want to compare "state $t_1$" and during which we want to manually input "diagnosis rules", that is to assign values to the "integrity control variables" and to the "size control variables" for each occurrence of each of the three tables of "state $t_0$".

The manual modification (Step II.2) of the "integrity control variables" can be done over the 3 tables of "state $t_0$".

An "integrity control variable" associated to a line of the second table known as the "files table" concerns a file and takes one of the following values:

02h to signal that there will be an error if the file is in state "$t_0$" and is not in state "$t_1$" (i.e. mandatory file), 03h to signal that there will be an error if the file is missing or has been modified, 00h no such error is possible with this file; it is the default value filled during the mentioned creation phase.

An "integrity control variable" associated to a line of the third table known as the "extensions table" concerns the files of a directory having a particular extension and takes one of the following values:

01h to signal that there will be an error if, in the given directory, one or more files having that extension are present in "state $t_1$" and are not in "state $t_0$", 00h no such error is possible with files having that extension (default value).

An "integrity control variable" associated to a line of the first table known as the "directories table" concerns the files and the sub-directories of the directory to which corresponds the said line.

The first byte of the mentioned "integrity control variable" of the first table concerns the files of the given directory other than those having the same extension as that of a line of the third table associated to the said directory and for which the mentioned line's "integrity control variable" is used. That byte takes one of the following values:

01h to signal that there will be an error if, in the given directory, one or more files having that extension are present in "state $t_1$" and are not in "state $t_0$", unless otherwise indicated by the "integrity control variables" of the lines of the third table associated to that directory, 00h no such error is possible in that directory unless otherwise indicated by the "integrity control variables" of the lines of the third table associated to that directory (default value).

The second byte of the said "integrity control variable" of the first table concerns the children sub-directories, grand-children, etc. of the said directory and takes one of the following values:

01h to signal that there will be an error if, in the given sub-directory, grand-children, etc., one or more files depending on that directory are present in "state $t_1$" and are not in "state $t_0$", unless otherwise indicated by the "integrity control variables" of the lines of this first table associated to those children directories, grandchildren, etc.

00h no such error is possible (default value).

The manual modification of a "size control variable" can be done over any or all 3 tables.

A "size control variable" of the second table known as the "files table" concerns a file and takes one of the following values:

01h to signal that there will be an anomaly if the size of the file shows an increase of more than 10% at comparison time;

02h to signal that there will be an anomaly if the size of the file shows an increase of more than 1 million bytes at comparison time;

00h no such error is possible with this file (default value).

A "size control variable" of the third table known as the "extensions table" concerns the files of a directory having a particular extension and takes one of the following values:

01h to signal that there will be an anomaly if the sum of the sizes of the files within the directory and having that extension shows an increase of more than 10% at comparison time;

02h to signal that there will be an anomaly if the sum of the sizes of the files within the directory and having that extension shows an increase of more than 1 million bytes at comparison time;

80h to signal that there will be an anomaly if the number of files within the directory and having that extension shows an increase of more than 10% at comparison time;

00h no such error is possible for the files having that extension (default value).

A "size control variable" associated to a line of the first table known as the "directories table" concerns a directory to which corresponds the said line and takes one of the following values:

01h to signal that there will be an anomaly if the sum of the sizes of the files within the directory shows an increase of more than 10% at comparison time;

02h to signal that there will be an anomaly if the sum of the sizes of the files within the directory shows an increase of more than 1 million bytes at comparison time;

80h to signal that there will be an anomaly if the number of files within the directory shows an increase of more than 10% at comparison time;

00h no such error is possible for directories, unless otherwise specified by the second and third tables (default value).

In certain cases, we might want to apply to certain files having a given extension "diagnosis rules" that are different of those applied to all the files of a directory and not have the corresponding line of the third table of "state $t_0$" be generated during the "creation phase"; that is what happens when no files in "state $t_0$" have this extension.

In a first step of the "manual input phase", known as the "virtual lines" creation step, before the step of manual modification of the values of the "integrity control variables", the process will advantageously offer the possibility to add, notably in the third table of "state $t_0$", lines known as "virtual lines" (Step II.1). Those lines do not materially correspond to any extension present on the external storage memory treated in "state $t_0$", after the creation phase, they only have a logical reality used to test their presence in "state $t_1$" or to do exclusion tests over specific cases. These lines all have the columns of the given table, but the columns "sum of the sizes", "number of files", "hour and date of last write access" and "checksum" are all unused and left to zero.

In a second step of the "manual input phase", known as the step of manual modification of the values of the "integrity control variables", the "virtual lines" can be manually updated just as the other lines. They are used just as are the other lines during the comparison phase.

In another realization mode, these "diagnoses rules" can be memorized independently from the three tables of "state $t_0$", in a fourth table that is different from the 3 first ones.

In a realization mode, that fourth table may have lines of the following type:

"DOC", "allowed in", "WORD4", "WORD5", "WINWORD"

Which line should be interpreted as: "all the files with the DOC extension are allowed in the directories WORD4, WORD5 and WINWORD".

In a different realization mode and for a multi-user operating system that brings forth the notion of number of the station that has created or modified a file, the said fourth table could have lines the following type:

"EXE", "create not allowed except station", "001"

Which line should be interpreted as: "files with an EXE extension may not be created nor copied except by station N° 001".

The mentioned "manual modification phase" is followed by a third phase (block III of FIG. 1) consisting in a repetition of the "creation phase" at time $t_1=t_0+T$ which produces a second state including tables Td1, Tf1 and Tt1 and known as "state $t_1$". In that case, the process compares the evolution of the treated external storage memory between two instants that are separated by a period T.

It is also possible to generate the first state, eventually manually, for a homogeneous logical sub-set that does not necessarily coincide with a computers external storage memory volume. It will be the case, for example, for a software package for which and only which we would like to save a state representing the tree structure of all the files of that software package that are installed so that it may run. These states are not associated to the notion of date but of that of software package version. Nevertheless, in the continuing description, we will talk about "state $t_0$". They may be assembled into libraries that may be referred to during the comparisons, notably to verify their integrity in the external storage memories at time $t_1$.

In another varying realization, the third table may not be generated during this phase and thus not be memorized in the produced state but be generated instead at the comparison's initialization.

The fourth phase known as the "comparison phase" (block IV of FIG. 1), consists, starting from "state $t_0$" and "state $t_1$" in fabricating 6 intermediate states, each of which contains the 3 tables (OTdi, OTfi, OTti) respectively related to the directories, the files and the extensions that "state $t_0$" and "state $t_1$" contain.

The 6 intermediate states are the following:

The intermediate state XD that will hereafter be called "state of the deleted" contains in it's second table a line for each of the only files that are present in "state $t_0$" and that are missing in "state $t_1$", and excluding all other line; the first table of that state contains the sole necessary lines to associate the given files to the Super-root of the external storage memory; The third table of that state contains the sole necessary lines to associate a given file to a line of same extension, In the same way, the intermediate state XA that will hereafter be called "state of the added" contains the only files that are missing in "state $t_0$" and that are present in "state $t_1$", In the same way, the intermediate state XI that will hereafter be called "state of the identical" contains the only files that are present in both "state $t_0$" and "state $t_1$" and that are unchanged, In the same way, the intermediate state XM that will hereafter be called "state of the modified" contains the only files that are present in both "state $t_0$" and "state $t_1$" and that have been modified between $t_0$ and $t_1$, In the same way, the intermediate state XRD that will hereafter be called "Union $t_0$" contains all the files of "state $t_0$" and all the files of "state $t_1$" that are missing in "state $t_0$", In the same way, the intermediate state XRA that will hereafter be called "Union $t_1$" contains all the files of "state $t_1$" and all the files of "state $t_0$" that are missing in "state $t_1$", The "comparison phase" consists of a first step (step IV.1 of block IV) known as the "sorting step" and of a second step known as the "analysis step" (step IV.2 of block IV).

The first step known as the "sorting step" IV.1 consisting in classifying all the lines of the three tables Td0, Tf0, Tt0 of "state $t_0$" as well as those of the three tables Td1, Tf1, Tt1 of "state $t_1$", consists itself of 6 sub-steps IV11 to IV16.

In the first sub-step IX11 of the "sorting step" which consists in classifying the first table Td0 corresponding to the directories of "state $t_0$", we proceed in the following manner:

we start by classifying by ascending directory name the lines that correspond to level 1 directories, and we place them at the head of the table right after the 0 level line that corresponds to the "Super-root", then we classify the lines corresponding to level 2 directories, with respect to the rank of the line of their level 1 parent directory, which causes all the lines of the child directories of the 1st parent directory, then the lines of the children of the second father, etc., to group themselves, this being done, within each of the said children groups, we sort the lines by ascending directory name, then, these lines are placed after the ones corresponding to level 1, the lines corresponding to level 1 being thus classified, we sort in the same way the lines of level 3, the process is repeated for each level until the maximum level.

In the second sub-step of the said "sorting step", we proceed in a way similar to the first sub-step IV12 in order to classify the first table Td1 of "state $t_1$".

In the third sub-step IV13, the lines of the second table concerning the files of "state $t_0$" are classified in the following manner:

ascending, depending on the level of the directory to which the file is associated, then inside each level, depending on the rank of the line corresponding to the directory to which the file is associated, then inside each directory, the lines are classified by ascending file extension, then inside each directory and each file extension, the lines are classified by ascending file name, In the fourth sub-step IV14 of the said "sorting step", we proceed in a way similar to the third sub-step in order to classify the second table Tf1 of "state $t_1$".

In the fifth sub-step IV15, the lines of the third table Tt0 concerning the extensions of "state $t_0$" are classified in the following manner:

ascending, depending on the level of the directory to which the extension is associated, then inside each level, depending on the rank of the line corresponding to the directory to which the extension is associated, then inside each directory, the lines are classified by ascending file extension, In the sixth sub-step IV16 of the said "sorting step", we proceed in a way similar to the fifth sub-step in order to classify the third table Tf1 of "state $t_1$".

So, at the end of these 6 sub-steps IV11 to IV16, by scanning simultaneously and sequentially the 3 tables of the two states "$t_0$" and "$t_1$" we get each time the informations associated to a line of the second table Tf0 of "state $t_0$" and the informations associated to the line of same name and same extension of the second table Tf1 of "state $t_1$", if there is one;

We also get and at the same time, the informations contained in the line of the third table Tt0 and in the line of the first table Td0 of "state $t_0$" to which is associated the line of the given second table Tf0 of "state $t_0$", as well as the informations contained in the first table Td1 of "state $t_1$" having the same directory name in "state $t_1$", if there is one, as well as the informations contained in the lines of the third table Tt1 of "state $t_1$" having the same extension in "state $t_1$", if there are any.

In case we wanted to limit the comparison of a "state $t_0$" to a sub-set of another state "state $t_1$", we eliminated by means of a filter, all the lines of the 3 tables of "state $t_1$" not pertaining to the tree branch that we want to compare to "state $t_1$". We proceed in the same way in the event we want to limit the comparison of a sub-set of a state "state to" to a "state $t_1$".

The second step known as the "analysis step" (Step IV2 of block IV) that consists in scrolling the lines of the 3 tables of "state $t_0$" and "state $t_0$" in parallel and in analyzing the different appearing situations, has itself in 4 substeps (IV21 to IV24).

During the first sub-step IV 21 of the mentioned "analysis step", the eventual changes in the extension are detected in the sequence of the lines of the second table Tf0 of "state $t_1$" and at the start of each block of lines of same extension of the said second table, and the "diagnosis rules" associated to that extension are recovered in the third table Tt0 of "state $t_0$".

If there is also a change of directory in the sequence of the lines of the second table of "state $t_0$", the "diagnosis rules" associated to that directory are recovered in the first table Td0 of "state to".

In the second sub-step IV22, for each line of the second table of "state $t_0$", depending on the presence simultaneously or not of a line of same name and same extension in the table of "state $t_1$", the "occurrence variables" are calculated (sub-step IV221) as well as the "error variables" (sub-step IV222) of the given second tables, and are generated the lines OTfi of the second tables of one or the other of the 6 intermediate states depending on the value of the said "occurrence variables" (sub-step IV223).

In a third sub-step IV2.3, at the end of the bloc of lines of the second table having the same extension, the lines OTti of the third table of one or the other of the 6 intermediate states are generated with the appropriate values for the "occurrence variables" and "error variables".

In a fourth sub-step IV2.4, if we are dealing with the end of a block of files belonging to the same directory, the lines OTdi of the first table of one or the other of the 6 intermediate states are generated with the appropriate values for the "occurrence variables" and "error variables".

During the mentioned second sub-step IV2.2, which only concerns the second tables, the comparison between the lines of the second table enables to have the 4 following configurations (sub-step IV223).

If we have the same line in the second tables of "state $t_0$" and "state $t_1$", and if also the size, hour and date of last write access are identical, the lines are said to be "identical", and the "occurrence variables" of the second lines of the given states are left at 00h; the "error variables" are easily deduced from the "diagnosis rules" of the said line of "state $t_0$", (no error in this case).

The line of "state $t_0$", duly filled with the new values of the "occurrence variable" and the "error variable", is copied onto the second tables OTfi of the 3 states: "state of the identical" XI, "union $t_0$" XRD and "union $t_1$" XRA.

If we have the same line in the second tables of "state $t_0$" and "state $t_1$", but that the size, hour or date of last write access differ, the lines are said to be "modified" and the "occurrence variables" of the lines of the second tables of the said states are given the values 01h.

The "error variables" are easily deduced from the "diagnosis rules" of the said line of "state $t_0$" as in the following example: if the "integrity control variable" of the given line has a value of 03h, since that line has been modified, the value of the "integrity error variable" will be 03h, which means that the file of "state $t_0$" has been wrongly modified.

The line of "state $t_0$", duly filled with the new values of the "occurrence variable" and the "error variable", is copied onto the second tables OTfi of the 2 states: "state of the modified" (XM) and "union $t_0$" (XRD).

The line of "state $t_0$", duly filled with the new values of the "occurrence variables" and the "error variables", is copied onto the second of "union $t_1$" XRA.

If a line is present in "state $t_0$" but not in "state $t_1$", the line is said to be "deleted", and the "occurrence variables" of the lines of the second tables of the said states are given the value 02h.

The "error variables" are deduced from the "diagnosis rules" of the said line of "state $t_0$" as in the following example: if the "integrity control variable" of the given line has a value of 02h, since that line has been deleted, the value of the "integrity error variable" will be 02h, which means that the mandatory file of "state $t_0$" is missing.

The line of "state $t_0$", duly filled with the new values of the "occurrence variable" and the "error variable", is copied onto the second tables Otfi of the two states: "state of the deleted" (XD) and "union $t_0$" (XRD).

It is also copied onto the state "union $t_1$" with an "occurrence variable" equal to 82h (to signal that it is a line that is not in "state $t_0$" (XRA);

If a line is present in "state $t_1$" but not in "state $t_0$", the line is said to be "added", and the "occurrence variables" of the second lines of the said states are given the value 03h.

In the present case, there is no "integrity control variable" in the second table of "state $t_0$"; hence we examine the third table of "state $t_0$" to see if there is a line that corresponds to the same extension;

If it is the case, we use the "integrity control variable" of that third table to calculate the "integrity error variables".

If it is not the case, we examine the first table of "state $t_0$" to see if there is a line that corresponds to the same directory;

If it is the case, we use the first byte of the "integrity control variable" of the mentioned table to calculate the "integrity error variables".

If it is not the case, we examine the first table of "state $t_0$" to see if there is a line that corresponds to the same father directory, or if not to a grand father directory, etc., from which we get the second byte of the "integrity control variable";

If the concerned byte of the "integrity control variable" has a value of 01h, it means that the file is in excess in "state $t_1$" with respect to "state i $t_0$", and the "integrity error variable" will be given the value 01h.

The line of "state $t_1$", duly filled with the new values of the "occurrence variable" and the "error variable", is copied onto the second tables OTfi of the two states: "state of the added" (XA) and "union $t_1$" (XRA).

It is also copied onto the state "union $t_0$" with an "occurrence variable" equal to 83h;

During the third sub-step IV23, we again go through the 6 intermediate states, and for each of those states, we generate a line of the third table OTti of that state if during the said previous second sub-step at least a line of the second table was written with the same extension.

For the "integrity error variable", we use the following rule:

if there is at least one line in the second table generated with an "integrity error variable" of 01h, (excess file), the 01h rank bit of the "integrity error variable" is set to 1, if there is at least one line in the second table generated with an "integrity error variable" of 02h, (missing file), the 02h rank bit of the "integrity error variable" is set to 1, so that the said "integrity error variable" is set to values ranging from 00h (no error) to 03h.

During the fourth sub-step IV24, we proceed as it is done in the said third sub-step to generate the first tables OTdi of the 6 intermediate states.

The "diagnosis rules" concerning the size, contained in the "size control variables", and their ensued "size error variables" are treated as "integrity control variables" and as "integrity error variables".

The mentioned fifth phase (block V of FIG. 1) of process results exploitation, exploits the 6 intermediate states generated during the said fourth phase to generate analysis reports and to take corrective actions on the files of any said external storage memory.

As an example, and in a non restrictive way, we can quote the creation of an "integrity errors" report that is fabricated in the following manner:

Using a filter, we only keep, of the 3 intermediate states that are "state of the added" (XA), "state of the deleted" (XD) and "state of the modified" (XM), the lines that have an "integrity error variable" different from 00h;

Then we merge the 3 intermediate states thus modified to fabricate a new intermediate state, from which we can edit the list of the excess, missing, or wrongly modified files in "state $t_1$" and compared to "state $t_0$".

I claim:

1. Process for comparison of computer files, ordinary or special, notably of executable type, data files, system files and setup files, stored in at least one external storage memory, structured under the form of directory trees containing said computer files, said process comprising the steps of:

memorization at time $t_0$ of a first state of at least on external storage memory, said first state comprising at least one first table having rows referring to directories of said memory and columns containing information on said first state directories given by the computer operating system, and at least one second table having rows referring to the files pertaining to said first state directories and columns containing information on said first state files given by the computer operating system, memorization at time $t_1=t_0+T$ of a second state of at least one external storage memory, said second state comprising at least one first table having rows referring to directories of said memory and columns containing information on said second state directories given by the computer operating system, and at least one second table having rows referring to the files pertaining to said second state directories and columns containing information on said second state files given by the computer operating system, comparison of all or only a part of the first state with all or only a part of the second state, which consists of at least one of the following steps:

a) at least temporary memorization of the informations stored in the compared parts of the first and second states concerning respectively the directories and the files deleted from said memory, namely the directories and the files present in the first and second table respectively of the compared part of the first state and missing in the first and second table respectively of the compared part of the second state, b) at least temporary memorization of the informations stored in the compared parts of the first and second states concerning respectively the directories and the files added to said memory, namely the directories and the files missing in the first and second table respectively of the compared part of the first state and present in the first and second table respectively of the compared part of the second state, c) at least temporary memorization of the informations stored in the compared parts of the first and second states concerning respectively the directories and the files modified in said memory, namely the directories and the files present in the first and second table respectively of the compared part of the first state and also present in the first and second table respectively of the compared part of the second state with the rows and columns of the respective directories and files of the first and second table of the first state differing from the corresponding rows and columns of the respective directories and files of the first and second table of the second state, d) at least temporary memorization of the informations stored in the compared parts of the first and second states concerning respectively directories and files identical in said memory, namely the directories and files present in the first and second table respectively of the compared part of the first state and in the first and second table respectively of the compared part of the second state with the rows and columns of the respective directories and files of the first and second table of the first state being identical to the corresponding rows and columns of the respective directories and files of the first and second table of the second state.

2. Process for comparison of computer files according to claim 1, said comparison step comprising at least one of the following steps:

a) at least temporary memorization of the reunion on one hand of the informations concerning the files and directories stored in the compared part of the second state and on the other hand of the informations stored in the compared parts of the first and second states concerning the files and directories deleted from said memory, b) at least temporary memorization of the reunion on one hand of the informations concerning the files and directories stored in the compared part of the first state and on the other hand of the informations stored in the compared parts of the first and second states concerning the files and directories added to said memory.

3. Process for comparison of computer files according to claim 1 or 2 wherein at least one of the first and second states comprises at least a third table having rows referring to the file types of a directory of an external storage memory tree, said types organizing ordinary files and special files contained in the said memory tree directory, and said third table associating each of the said file types with information, obtained by logical, arithmetic and string operations processed out on the information given by the computer operating system on each file of a given type, contained in said memory tree directory, said information being stored in the columns of said third table.

4. Process for comparison of computer files according to claim 3 where the comparison step is preceded by a memorization step of comparison criteria hereinafter called diagnosis rules, respectively on the directories, on the files and on the file types, said criteria being verified during the comparison step, in a phase called the verification phase of the diagnosis rules.

5. Process for comparison of computer files according to claim 4, wherein the memorization of said diagnosis rules comparison criteria respectively on the directories, on the files and on the file types, is carried out in columns, respectively on the first, on the second and on the third table of at least one of the first and second states.

6. Process for comparison of computer files according to claim 4, wherein the memorization of diagnosis rules comparison criteria respectively on the directories, on the files and on the file types is carried out in a fourth table of at least one of the first and second states.

7. Process for comparison of computer files according to claim 3 wherein at least one of the first, second and third tables respectively from the first and second states includes supplementary columns for each row corresponding to a directory, a file or a file type; said supplementary columns being:

initialized during the memorization step of the first state at time $t_0$ and of the second state at time $t_1$ respectively, and filled for each row of the said tables, during the comparison step between the said compared parts of said first and second states, by one of the "occurring" values associated with the possible results of the comparison for the respective item corresponding to the said row, and taken amongst the directories, the files and the file types belonging to the said compared parts of the first and second states, said possible results being: deleted item, added item, modified item and identical item.

8. Process for comparison of computer files according to claim 4, at least one of the first, second and third tables respectively of the first and of the second state includes supplementary columns for each row, corresponding to a directory, a file or a file type, said supplementary columns being initialized during the memorization step of the first state at time to and of the second state at time $t_1$ respectively, and filled for each row of the said tables, during said comparison step, by one of the "error" values associated with the possible results of the comparison, during said "diagnosis rules" verification phase, applied to the item corresponding to the said row and taken amongst the directories, the files and the file types, belonging to the said compared parts of the first and second states, said possible results being: on one hand, excess item, missing item, wrongly modified item, and on the other hand, all error or fault criteria results previously memorized.

9. Process for comparison of computer files according to claim 4 where the comparison step is preceded by a memorization step in the tables of the first and of the second state, of additional rows corresponding to items taken amongst directories, files and file types, said additional rows being missing at the beginning of the memorization steps at time $t_0$ and time $t_1$ respectively.

10. Process for comparison of computer files according to claim 3 where the first table, also called the directory table, the second table, also called the file table and the third table, also called the file type table, of at least one of said first and second state are merged into a single table for each state, the rows of said single table corresponding respectively to the directories, to the files and to the file types.

* * * * *